US009913128B2

(12) United States Patent
Rajasekar et al.

(10) Patent No.: US 9,913,128 B2
(45) Date of Patent: Mar. 6, 2018

(54) SUBSCRIBER DATA FEDERATION IN A TELECOMMUNICATIONS NETWORK

(71) Applicant: Oracle International Corporation, Redwood Shores, CA (US)

(72) Inventors: Sharath Rajasekar, San Francisco, CA (US); Andreas E. Jansson, San Francisco, CA (US); Rahul Shinde, Fremont, CA (US); Paul Goodhand, Ipswich (GB); Matthew John Rayner, Porirua (NZ); Andrew Grant, Ipswich (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 40 days.

(21) Appl. No.: 14/804,574

(22) Filed: Jul. 21, 2015

(65) Prior Publication Data
US 2016/0277920 A1 Sep. 22, 2016

Related U.S. Application Data

(60) Provisional application No. 62/134,121, filed on Mar. 17, 2015.

(51) Int. Cl.
*H04W 8/20* (2009.01)
*H04W 8/10* (2009.01)
*H04L 29/06* (2006.01)

(52) U.S. Cl.
CPC .......... *H04W 8/20* (2013.01); *H04L 65/1016* (2013.01); *H04L 65/1063* (2013.01); *H04L 65/1073* (2013.01); *H04W 8/10* (2013.01)

(58) Field of Classification Search
CPC .... G06F 19/00; G06F 17/30575; H04W 8/20; H04W 8/10; H04L 65/1016; H04L 65/1063; H04L 65/1073; H04L 63/0807
USPC .......................................... 455/406
See application file for complete search history.

(56) References Cited

U.S. PATENT DOCUMENTS

| 6,934,751 | B2 | 8/2005 | Jayapalan et al. |
| 8,208,930 | B2 | 6/2012 | Askerup et al. |
| 8,219,697 | B2 * | 7/2012 | Langen ............ H04L 29/12188 709/220 |
| 2007/0106933 | A1 * | 5/2007 | Nene ...................... G06Q 10/10 715/210 |
| 2009/0112875 | A1 * | 4/2009 | Maes ................ G06F 17/30575 |

(Continued)

OTHER PUBLICATIONS

3GPP TR 23.803 (V7.0.0 (Sep. 2005) Technical Report; "3rd Generation Partnership Project; Technical Specification Group Services and System Aspects; Evolution of Policy Control and Charging"; Release 7.

*Primary Examiner* — Olumide T Ajibade Akonai
*Assistant Examiner* — Margaret G Mastrodonato
(74) *Attorney, Agent, or Firm* — Miles & Stockbridge P.C.

(57) ABSTRACT

A method for retrieving data from a telecommunications network includes receiving a request at a view for the subscriber data from a telecommunications application, where the subscriber data resides on multiple data sources. The method includes sending the request to each data source coupled to the view and receiving the subscriber data from the data sources coupled to the view. The method further includes merging the subscriber data into a single data record and returning the merged data record to the telecommunications application.

20 Claims, 7 Drawing Sheets

(56) References Cited

U.S. PATENT DOCUMENTS

| | | | |
|---|---|---|---|
| 2009/0193057 A1* | 7/2009 | Maes | H04L 67/306 |
| 2012/0030331 A1* | 2/2012 | Karampatsis | H04L 41/0893 |
| | | | 709/223 |
| 2013/0283037 A1 | 10/2013 | Katz et al. | |
| 2013/0332194 A1* | 12/2013 | D'Auria | G06F 19/322 |
| | | | 705/3 |

* cited by examiner

SUBSCRIBER DATA FEDERATION IN A TELECOMMUNICATIONS NETWORK

CROSS REFERENCE TO RELATED APPLICATIONS

This application claims priority of Provisional Patent Application Ser. No. 62/134,121, filed on Mar. 17, 2015, the contents of which is hereby incorporated by reference.

FIELD

One embodiment is directed generally to a telecommunications network, and in particular to the retrieving of and access to subscriber data in a telecommunications network.

BACKGROUND INFORMATION

Session Initiation Protocol ("SIP") is an application-layer control protocol for creating, modifying, and terminating sessions with one or more users. These sessions include Internet telephone calls, multimedia distribution and multimedia conferences. SIP invitations create sessions that allow the users to agree on a set of compatible media types based on session descriptions configurable within the protocol. A SIP session with one or more users can occur over a SIP based network, such as the Internet Protocol Multimedia Subsystem ("IMS") network.

IMS is a standardized next generation networking architecture for providing multimedia services in mobile/wireless and fixed/wire-line communication networks. IMS uses the Internet protocol ("IP") for packet-data communications generally, and voice over IP ("VoIP") for voice communications, based on a 3rd Generation Partnership Project ("3GPP/3GPP2") standardized implementation of SIP. IMS includes session control, connection control, and an application services framework along with subscriber and services data. It enables the use of new converged voice and data services, while facilitating the interoperability of these converged services between subscribers. However, in a typical IMS network, there are multiple sources of subscriber data located in multiple different locations.

SUMMARY

One embodiment is a method for retrieving data from a telecommunications network. The method includes receiving a request at a view for the subscriber data from a telecommunications application, where the subscriber data resides on multiple data sources. The method includes sending the request to each data source coupled to the view and receiving the subscriber data from the data sources coupled to the view. The method further includes merging the subscriber data into a single data record and returning the merged data record to the telecommunications application.

DETAILED DESCRIPTION

One embodiment is a system that provides federation of subscriber data from multiple sources within a telecommunications network such as an IMS network. The federation amalgamates the data into a single view which can be provided to an application server within the network.

Figure 1:
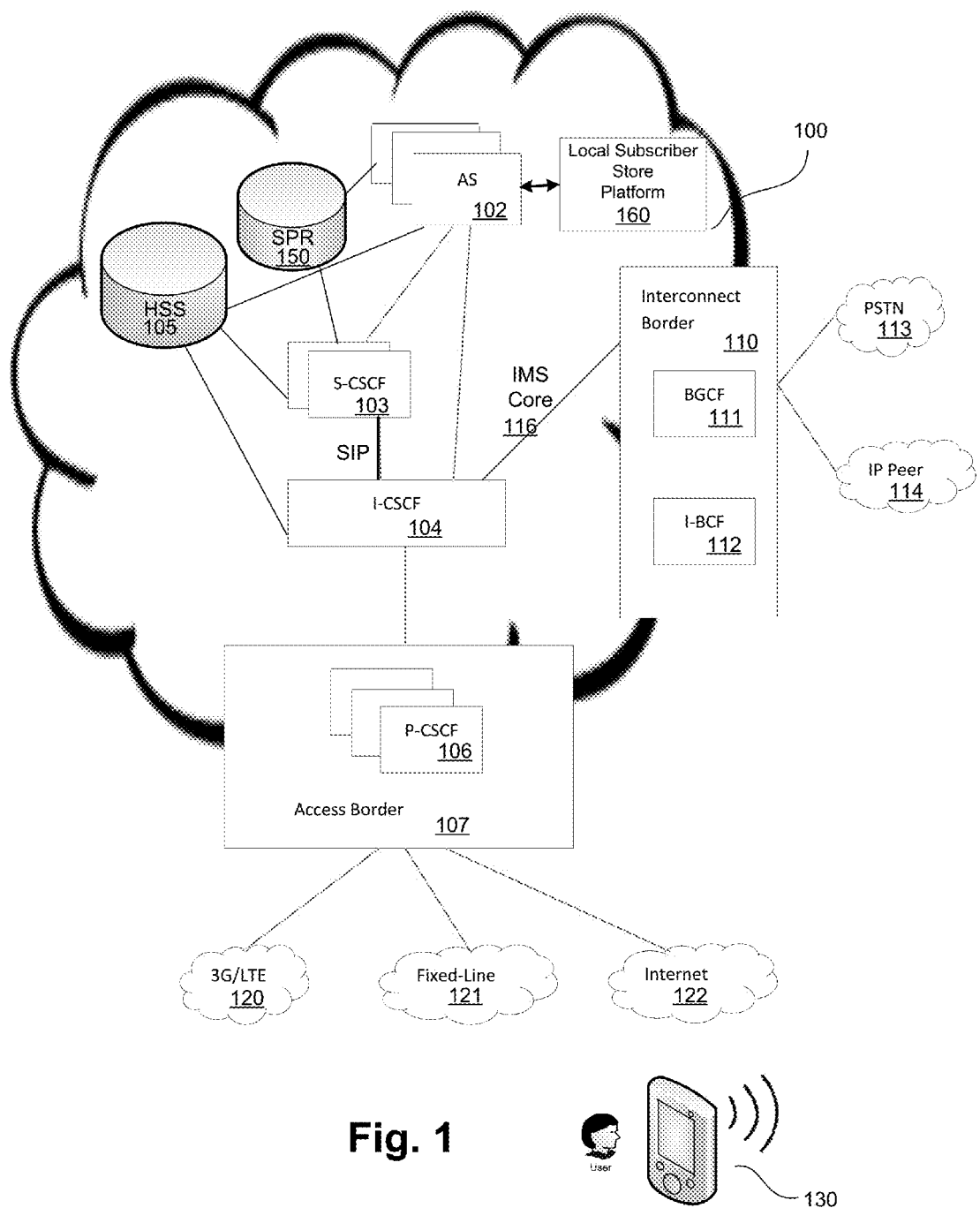
FIG. 1 is an overview diagram of an IMS network including network elements that implement embodiments of the present invention and/or interact with embodiments of the present invention.

FIG. 1 is an overview diagram of an IMS network 100 including network elements that implement embodiments of the present invention and/or interact with embodiments of the present invention. Network 100 includes an IMS core 116 that includes an Interrogating Call Session Control Function ("I-CSCF") 104 and one or more Serving Call Session Control Functions ("S-CSCF") 103 or "serving functions".

IMS network 100 further includes an access border 107 that includes one or more Proxy Call Session Control Functions ("P-CSCF") 106 or "entry points" such as Session Border Controllers ("SBC"). In general, the CSCF entities are implemented by one or more SIP servers or proxies. I-CSCF 104 is coupled to each S-CSCF 103 via a SIP interface for transmitting SIP packets.

IMS network 100 further includes one or more Application Servers 102 ("AS"), one or Home Subscriber Servers 105 ("HSS"), and one or more Subscriber Profile Repositories ("SPR") 150. An Interconnect Border 110 couples IMS core 116 to various external networks, including the Public Switched Telephone Network 113 ("PSTN") and an Internet Protocol ("IP") peer network 114. In one embodiment, AS 102 is an "Oracle Communications Evolved Communications Application Server" ("OCECAS") server from Oracle Corp. In one embodiment, AS 102 provides SIP multimedia services to IMS subscribers and includes a Voice over Long Term Evolution ("VoLTE") and Wi-Fi-based VOIP ("VoWiFi") application. In general, both HSS 105 and SPR 150 provide a central store for subscriber data in the IMS network. In one embodiment, HSS 105 authenticates the LTE subscribers for IMS VoLTE registration, while SPR 150 stores the subscribers' policies and profiles for Quality of service ("QoS") management related to a Policy and Charging Rules Function ("PCRF").

Access border 107 couples User Equipment 130 ("UE") to IMS network 100. UE 130 may be any device used by an end-user for communications, including a smartphone, a laptop computer, a tablet, etc. UE 130 can connect to IMS network 100 through a third generation Long Term Evolution ("3G/LTE") network 120, a fixed-line network 121, via the Internet 122, or using any known communication methods.

Figure 2:
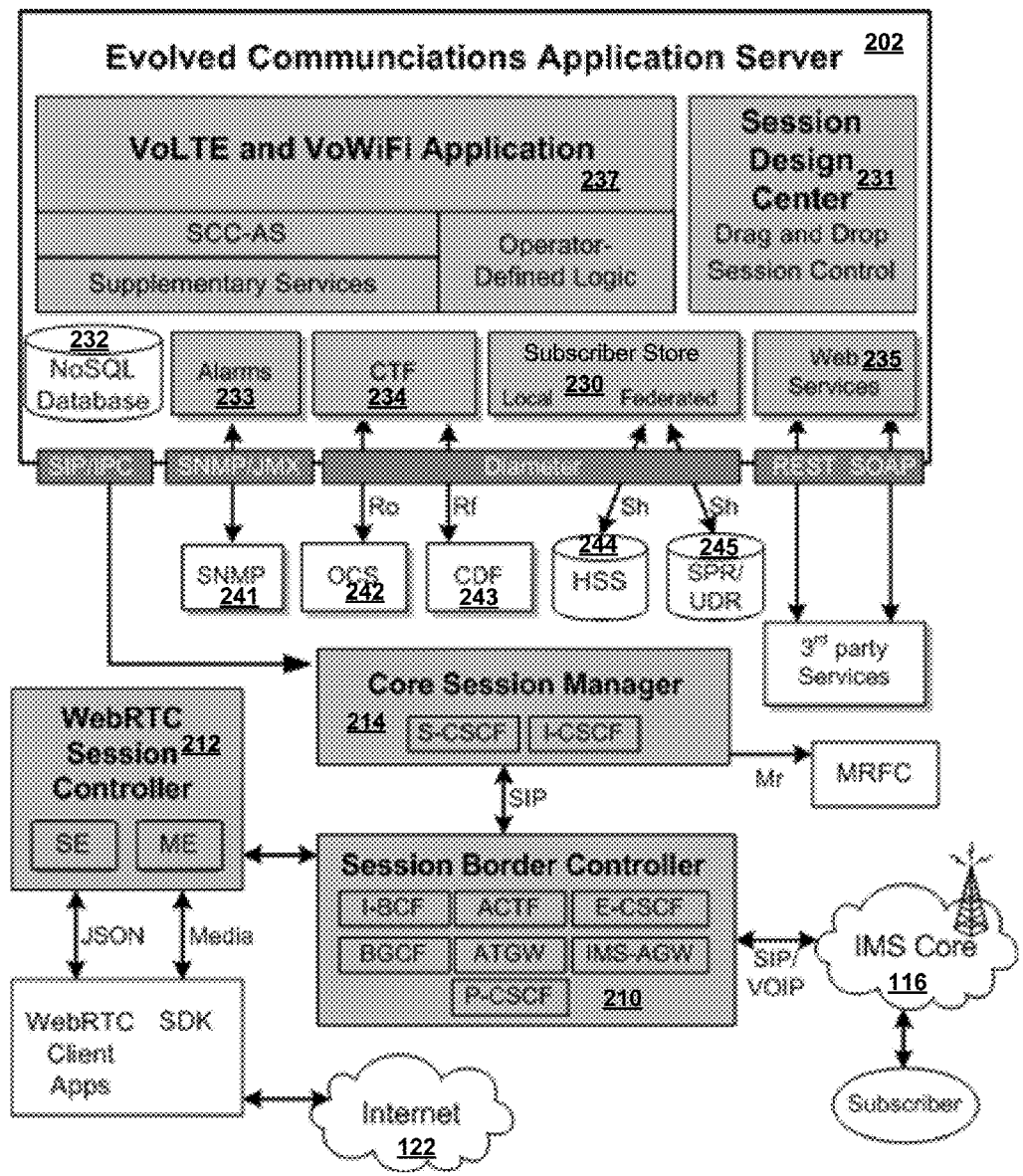
FIG. 2 is another overview diagram of an application server and an IMS network in an Oracle Communications Evolved Communications Application Server environment, including network elements that implement embodiments of the present invention and/or interact with embodiments of the present invention.

FIG. 2 is another overview diagram of an application server and an IMS network in an OCECAS environment, including network elements that implement embodiments of the present invention and/or interact with embodiments of the present invention. Application server 202 is an OCECAS application server for VoLTE services. More specifically, server 202 is an IMS application server responsible for call control. It provides VoLTE-centric single radio voice call continuity ("SRVCC") telephony voice and video communications to packet-switched IMS networks. Application server 202 interacts with border controllers such as a Session Border Controller 210 from Oracle Corp.

Application server 202 includes a VoLTE and VoWifi application 237, a Session Design Center 231, a not only SQL ("NoSQL") database 232, alarms 233, a charging triggering function ("CTF") 234, a local user data repository ("UDR") or local subscriber store 230, and web services 235. Local subscriber store 230 directly interfaces with NoSQL database 232.

Application server 202 interacts with external elements in one embodiment, including a Simple Network Management Protocol ("SNMP") 241, an online charging system ("OCS") 242, a charging data function ("CDF") 243, an HSS database 244, and an SPR/UDR database 245. In one embodiment, SPR/UDR database 245 is optional or does not exist as its functionality is provided by local subscriber store 230. Application server 202 further interacts in one embodiment with a Web Real Time Communication ("WebRTC") Session Controller 212 and a Core Session Manager 214. Application server 202 connects to IMS core network 116 through Core Session Manager 214 using a Session Border Controller 210.

WebRTC Session Controller 212, from Oracle Corp., enables real-time communications between web browsers and SIP, and web browsers and PSTN phones. WebRTC Session Controller 212 uses WebRTC, which is an API standardized by the World Wide Web Consortium ("W3C"). WebRTC enables web browsers to directly share video, audio, and data.

Session Border Controller 210, from Oracle Corp., interacts with application server 202 in Voice over Internet Protocol ("VoIP") networks in setting up, processing, and tearing down secure SIP-based interactive communications sessions.

Core Session Manager 214, from Oracle Corp., is an agile session core for supporting VoLTE services ("VS-CSCF"). It directs signaling flows through the network and between elements. It provides a set of session core functions including IMS Call/Session Control Functions ("CSCF") and their associated 3GPP interfaces.

Figure 3:
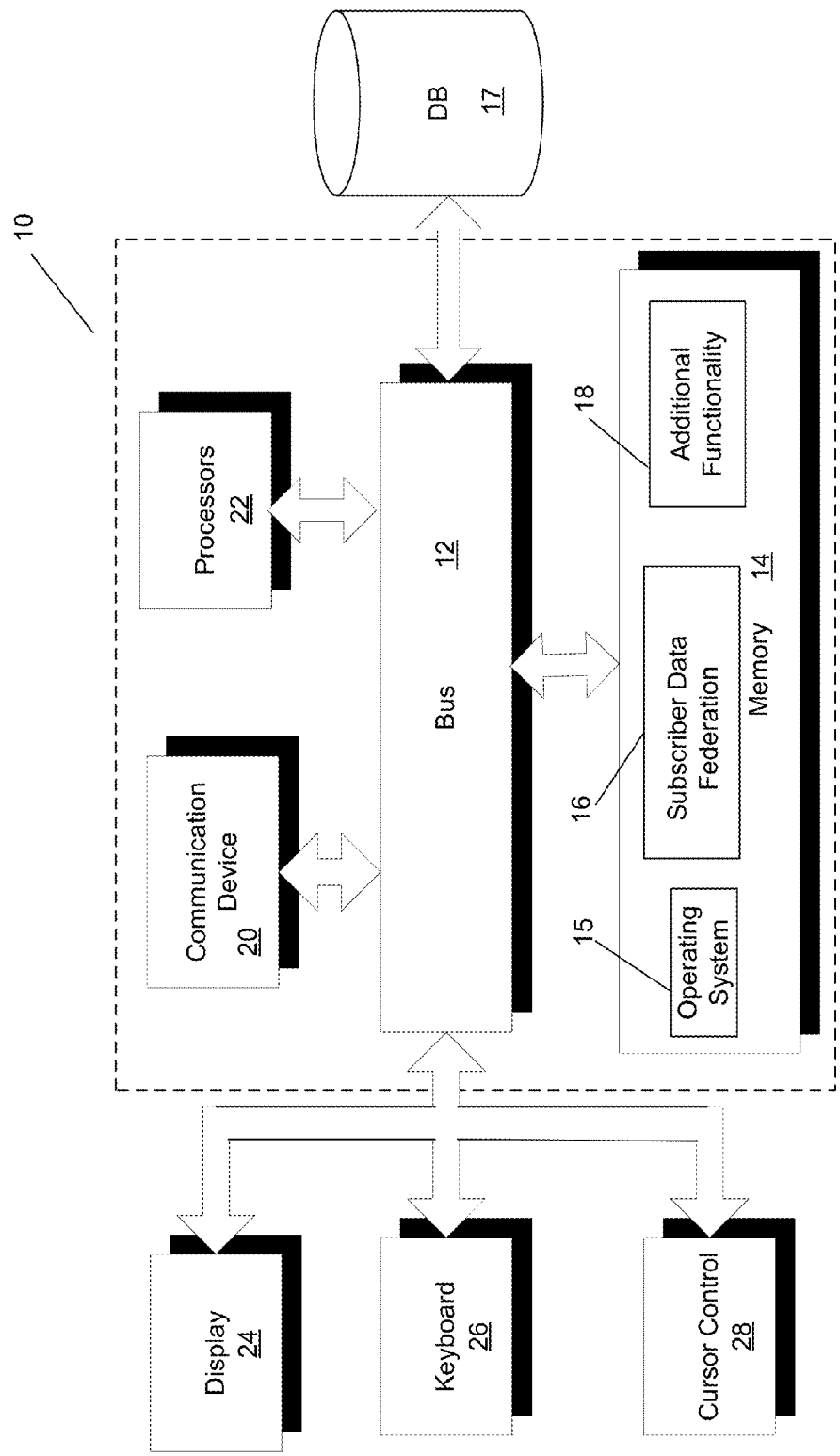
FIG. 3 is a block diagram of a computer server/system in accordance with an embodiment of the present invention.

FIG. 3 is a block diagram of a computer server/system 10 in accordance with an embodiment of the present invention. System 10 can be used to implement any of the network elements shown in FIGS. 1 and 2 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of AS 102 of FIG. 1 or server 202 of FIG. 2, system 10 may be a server that in general has no need for a display 24 or one or more other components shown in FIG. 3.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a subscriber data federation module 16 for providing subscriber data federation, and all other functionality disclosed herein. System 10 can be part of a larger system, such as added functionality to an OCECAS server from Oracle Corp. Therefore, system 10 can include one or more additional functional modules 18 to include the additional functionality. A database 17 is coupled to bus 12 to provide centralized storage for modules 16 and 18.

Referring again to FIG. 1, telecommunications service providers and facilitators of enterprise communications (i.e., "providers"), in addition to needing access to HSS 105, also require access to SPR 150 for even the most basic services. In general, and in one embodiment, HSS 105 and SPR 150, either separately or collectively, depending on implementation, can be referred to as a "subscriber store" or a "local NoSQL" store. For many existing providers, HSS 105 may be well established, and although a supplier may be able to provide a platform replacement, the cost and risk of migrating subscribers to a new subscriber store may be cost prohibitive to an existing provider.

Further, for a new telecommunications provider, there is no existing subscriber data to migrate. However, they may prefer to use a different subscriber store than what can be offered by the implementing vendor's sales or service delivery teams.

Embodiments of the present invention provide the ability to take subscriber store data from multiple sources and to combine this into a single response for the requesting application. In many circumstances, the subscriber store data may be distributed. For example, some data may be held in a local persistence store and some data may be held in a remote data store such as HSS 105. In addition to reading, data could also be updated to the data sources, which might include first fetching data from one data source and updating to another.

In one embodiment, the requesting application is separated from an adaptor layer that interacts with the different data sources, allowing the solution provided for the persistent store to be changed without impacting the requesting application. The adapter layer is formed of software layers so that the application layer in the OCECAS application server is isolated from the data layer. In contrast, with known solutions, the requesting application would need to be changed if the persistent store was changed.

The federation of subscriber data in accordance with embodiments of the invention is also referred to as UDR or subscriber store federation. A subscriber store in one embodiment includes subscriber data, including information about services to which the subscriber has subscribed. The data can reside in multiple data sources that are accessed and presented through a defined view. Subscriber data federation, in accordance with embodiments of the invention, allows for the persistent store to be located either locally or remotely, and possibly both, and for it to be transparent to the requesting application. Further, embodiments provide a provider with flexibility for migration and selection of suppliers of subscriber data.

Figure 4:
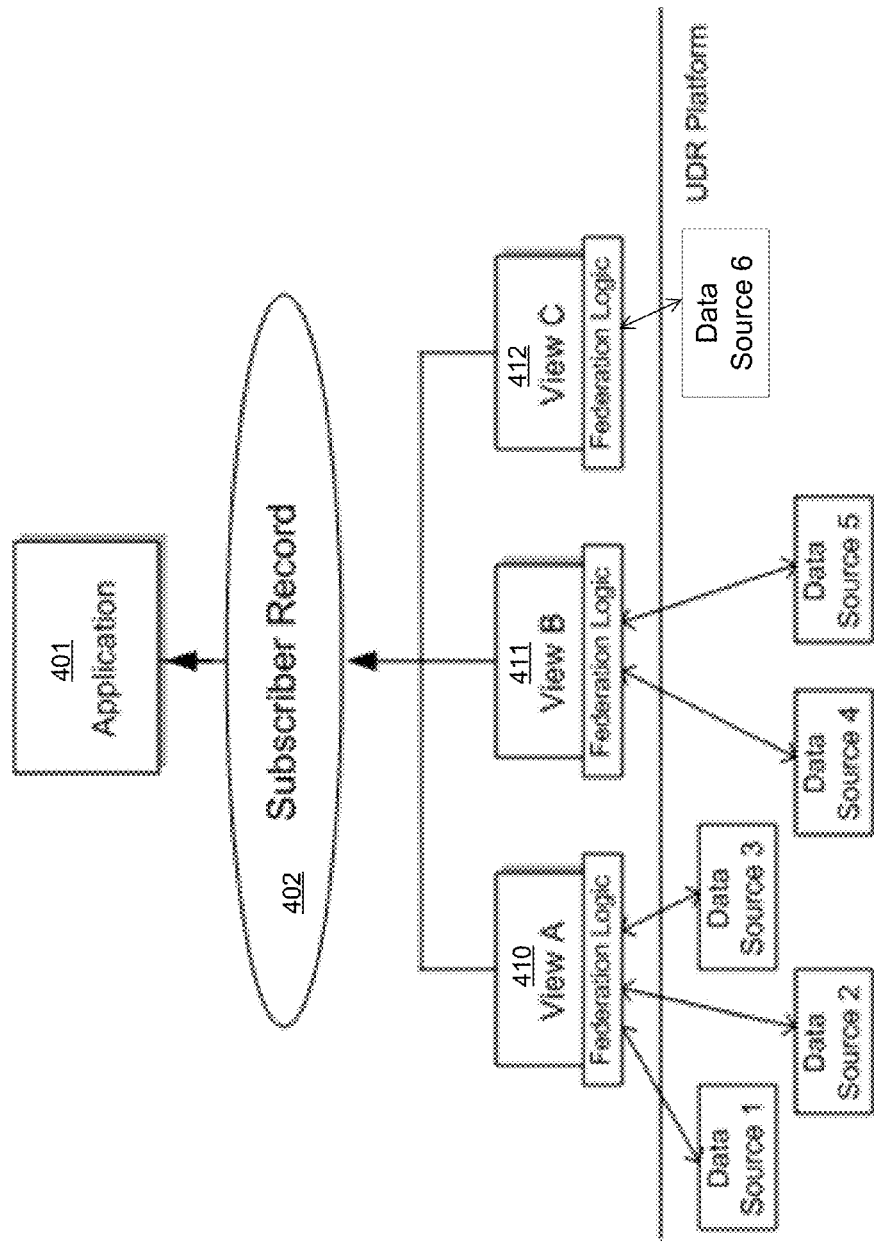
FIG. 4 is a block diagram of an embodiment of the present invention.

FIG. 4 is a block diagram of an embodiment of the present invention. As shown, a telecommunications application 401 within an application server (e.g., application server 202 of FIG. 2), receives subscriber record data (e.g., subscriber store data) 402. Data 402 is formed by multiple sources of disparate data, shown as data sources 1-6, some of which is geographically remote from application 401. Data sources 1-6 form a UDR platform in one embodiment, such as subscriber store 230. The UDR platform is the adapter layer in one embodiment.

Embodiments include multiple views 410-412. Each view includes federation logic, and can be coupled to one or more sources of subscriber data. Subscriber data from multiple data sources 1-6 are accessed through a view. The view includes information, including connection details, about how to retrieve the required data from one or more data sources (i.e., federation) and combine it into a single record 402 that it returns to application 401. The view also allows the application to update the elements of the subscriber record back to the data sources. For cases where the data provider supports notification updates on changes to underlying data, these are also notified to the application. The view is aware of the data storage location, the format of the data, the format in which application 401 expects to receive the data, and the mapping between the two. Application 401, on the other hand, in one embodiment knows only the format of the data to be returned and has no knowledge of the federation logic contained within the view.

In one embodiment, application 401 uses NoSQL as its default subscriber store. NoSQL's principal characteristic is its non-conformance to the relational database model. It is a database management and design model that is intended to scale and perform better for very large data storage applications. Application 401 is able to access and store subscriber data that is held within multiple external data sources, in addition to its own local subscriber store.

Views 410-412 amalgamate data that is provided by one or more data sources, which can come from one or more providers. The view itself contains a data source that defines the data type and the schema for the view. The view is also tied to federation logic that converts data from the various data sources into the formatted record 402 that application 401 expects. The application can configure one or more such views, each of which can be configured to fetch certain pieces of data from the data source. Each view serves as an independent unit of a Subscriber record that it might be interested in based on the functionality it wants to provide.

In one embodiment, data is returned to application 401, or any other requestor, in a defined JavaScript Object Notation ("JSON") document. JSON is a text-based data-interchange format that is programming-language independent. In one embodiment, application 401 delivers two default views, one for the NoSQL subscriber store and one for HSS 105.

As disclosed, embodiments provide for the federation of subscriber data 402 from multiple internal or external data sources. The data routing to the data sources is managed through a configuration in the data layer and where the data is being retrieved from is transparent to the requesting application 401. The data retrieved from multiple sources is amalgamated into a single response 402 for the requesting application 401. This prevents multiple round trips from the application 401 to each data source and the multiple data sources are transparent to the application 401 requesting the data, thus allowing the data sources to be customized through on site configuration without the requesting application 401 having to be updated.

Although FIG. 4 illustrates a view being associated with multiple data sources (e.g., views 410, 411), in some embodiments a view may be associated with a single data source, such as view 412.

Figure 5:
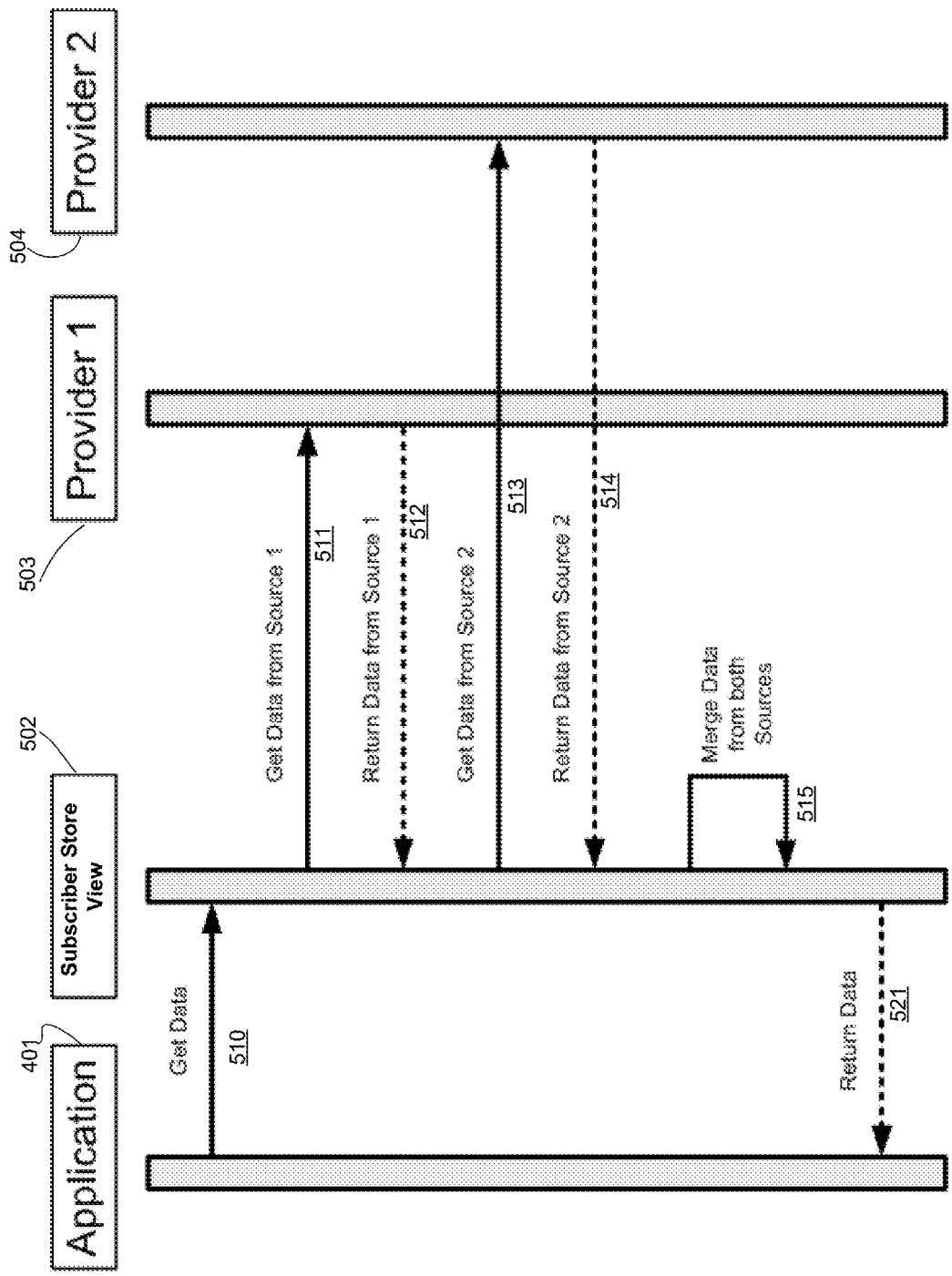
FIGS. 5 and 6 are call flow diagrams in accordance with one embodiment of the present invention.
Figure 6:
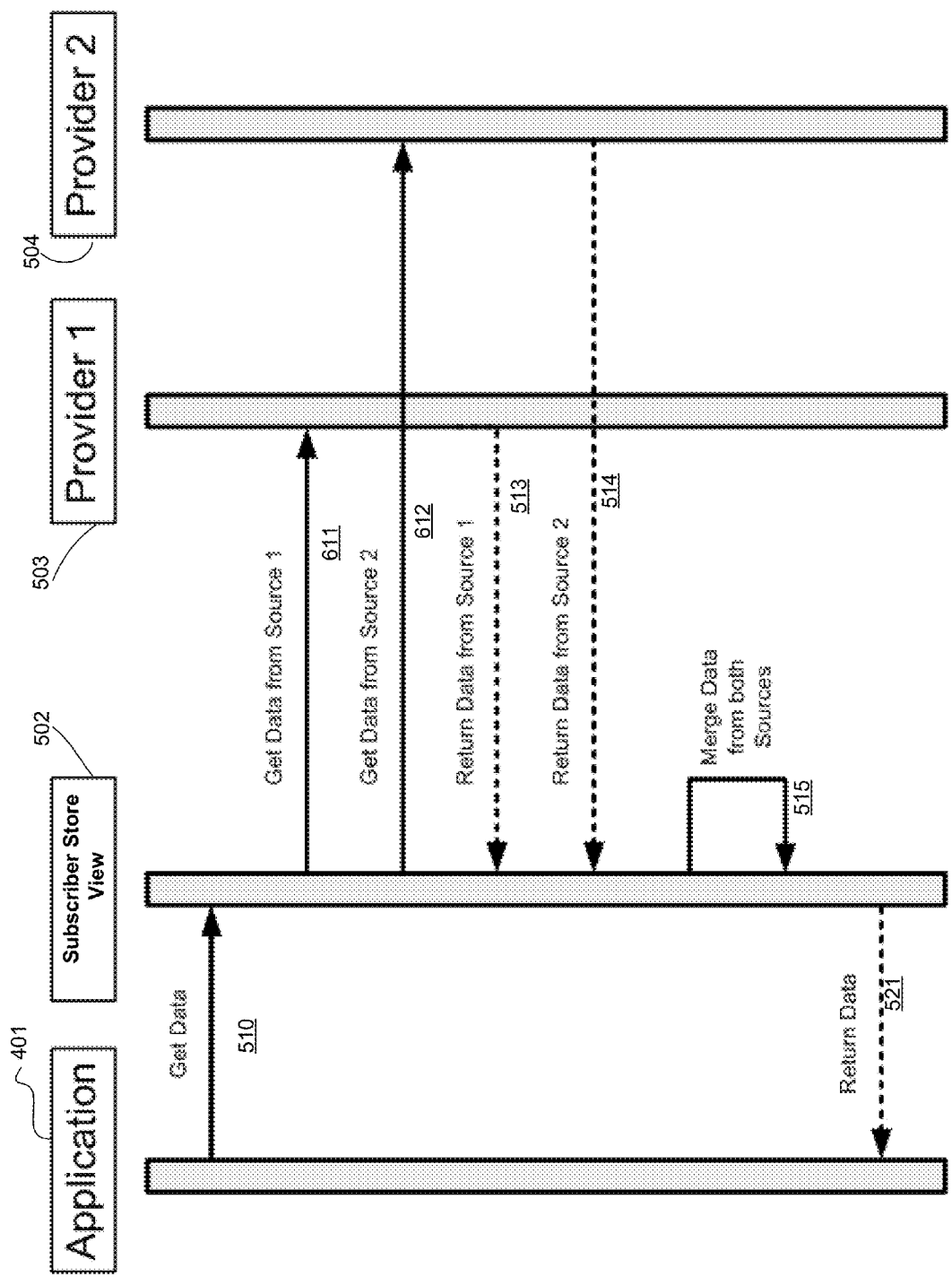

FIGS. 5 and 6 are call flow diagrams in accordance with one embodiment of the present invention. The call flows shown in FIGS. 5 and 6 are from a single request of data from application 401 of FIG. 4 (request 510), the federation of data at a view 502 from multiple data sources 503, 504 (via flows 511-514), and then the merging of that data (merge 515) into a single response (response 521) sent back to application 401.

In the example of FIG. 5, independent data is retrieved from multiple data sources 503, 504, where the requests to each data source are sent simultaneously. In the example of FIG. 6, federation chaining to data sources is used, where the response from the request to the first data source (request 611) is used in the request to the second data source (request 612). In both examples, a single amalgamated response (521) is sent to application 401.

Referring again to FIG. 4, in one embodiment, each view 410-412 defines the associated provider data source (data sources 1-6) and the federation logic, and each view includes the following attributes:
  1. View Id—reference during operations from applications;
  2. Subscriber Store View Data Model—disclosed below;
  3. Subscriber Store View Federation—disclosed below.

In one embodiment, each data source 1-6 is associated with at least one view and includes the following attributes:
  1. Type—an enumeration of either CLASS (i.e., a blueprint that combines attributes and methods in JAVA) or JSON;
  2. Data Type:
     a. CLASS based—the application can define its own schema using a JAVA Type through extending the UserProfileData class;
     b. CLASS based—the application can define its own schema using key-value pairs through extending the MappedUserProfileData class;
     c. CLASS based—the application can define its own schema using key-value pairs through extending the DiameterUserProfileData class;
     d. CLASS based—a generic means of sending custom JSON data through extending the JSONUserProfileData class;
  3. JSON Schema—contains the schema for this type;
  4. Access Level—an enumeration of either SYSTEM or APP to define whether the Data Source is associated with the View (APP) or the Provider (System). Additional details of the Subscriber Store Providers are disclosed below.

In one embodiment, two different types of subscriber data providers are defined. However, embodiments can be implemented with any type of Subscriber Store provider.

One type of provider, a NoSQL Subscriber Store provider, defines a Java application program interface ("API") as a method of communication between application 401 and the NoSQL Database. The NoSQL Subscriber Store Provider provides support for the Mapped UserProfileData and JSONUserProfileData data types for READ, UPDATE and NOTIFY operations.

Another type of provider, a Diameter protocol based Sh interface Subscriber Store Provider, defines a Diameter protocol based Sh interface as the method of communication between the application and the HSS. 3GPP TS 29.328 defines the IMS profile data that can be queried and update using the Sh interface. The Diameter Sh Subscriber Store Provider provides support for the DiameterUserProfileData data type for READ, UPDATE and NOTIFY operations.

In one embodiment, the following functionality is performed for the federation of outgoing requests:
1. Application creates UserProfileRequest and sends to the Subscriber Store Federation Layer.
2. Subscriber Store View Data is passed to the Subscriber Store Federation Layer to create Provider Data.
3. Subscriber Store Federation Layer maps UserProfileRequest data to the Provider Data using the Subscriber Store View Data Model.
4. Create Provider Message using the Provider Data for the specific Provider Id from the Subscriber Store View Data.
5. Dispatch the Provider Message to the required Provider.

In one embodiment, the following functionality is performed for the federation for incoming requests:
1. Receive Provider Messages from all Providers.
2. Subscriber Store View Data is passed to the Subscriber Store Federation Layer to create Application response.
3. Subscriber Store Federation Layer maps Provider Data to UserProfileResponse data using the Subscriber Store View Data Model.
4. Create UserProviderResponse using the Application Data from the Subscriber Store View Data.
5. Dispatch the UserProfileResponse to the Application.

One embodiment provides a main template that Application 401 can use to define the Federation layer. The logic to how to perform the various runtime operations should be added in the methods disclosed below, as shown in the complete federation example below. A public interface 'FederationLayer' is provided from which the application federation should extend. The 'FederationLayer' interface provides a read, and update and a notify API to the application developer for federation to multiple Subscriber Store data stores.

Application Federation should extend from the interface given below.
```
public interface FederationLayer {
/**
 * Process Read request and response.
 *
```

```
 * @param context the context
 * @throws IOException Signals that an I/O exception has occurred.
 */
void processRead(UserProfileContext context) throws IOException;
/**
 * Process Update request and response.
 *
 * @param context the context
 * @throws IOException Signals that an I/O exception has occurred.
 */
void processUpdate(UserProfileContext context) throws IOException;
/**
 * Process Notify events.
 *
 * @param context the context
 * @throws IOException Signals that an I/O exception has occurred.
 */
void processNotify(UserProfileContext context) throws IOException;
}
```

In one embodiment, each translation to/from a provider needs to extend the below interface to provide the appropriate mappings. There are similar interfaces when the provider supports varying types for request/response and read/update data types. A public interface 'TranslationLayer' is provided from which the application federation should extend. The 'TranslationLayer' interface provides a read (both request and response), an update (both request and response) and a notify API to the application developer for translation of data into a common format for the application.

```
public interface TranslationLayer<V, P> {
    P mapReadRequest(V data, UserProfileContext ctxt);
    V mapReadResponse(P data, UserProfileContext ctxt);
    P mapUpdateRequest(V data, UserProfileContext ctxt);
    V mapUpdateResponse(P data, UserProfileContext ctxt);
    V mapNotifyEvent(P data, UserProfileContext ctxt);
}
```

In one embodiment, the UserProfileContext that is passed around all the federation methods is given below. The 'UserProfileContext' interface provides an API for chaining operations and combining requests/responses for sending a single response back to the application.

Referring again to FIG. 6, in order to gather multiple data elements from either the same or different providers one after another, chaining can be performed from within the federation layer itself. This would be the case when the data from the first response is required in the input of another provider request. If multiple data elements are requested without any dependency on each other, no chaining is required and this can be done one after another as part of the same request.

Arguments can be passed from one chained handler to another and they will be available when the response arrives. The context can be used to store these arguments(setAttribute( . . . ) and getAttribute( . . . )). Each chain is set as a state inside the context. This is then checked when the response arrives to perform the response processing in that particular state. The following is example code, using the Groovy programming, that illustrates the usage of the APIs previously disclosed:

```
public void processRead(final UserProfileContext context) throws IOException {
    if (context.isOutgoing( )) {
        final UserProfileRequest request = context.getRequest( );
        final JSONUserProfileData providerData =
            translation.mapReadRequest((JSONUserProfileData) request.getProfileData( ), context);
```

-continued

```
    final UserProfileProviderMessage provMsg = context.createProviderMessage("p1", providerData);
    provMsg.validate( );
    // Dispatch to Provider
    provMsg.send( );
    context.setState("CHAIN_1");
} else {
  if (context.isState("CHAIN_1")) {
    final UserProfileProviderMessage pMsg = context.getProviderResponse("p1");
    final JSONUserProfileData providerData = pMsg.getData(JSONUserProfileData.class);
    final JSONUserProfileData appData = translation.mapReadResponse(providerData, context);
    final JsonNode chargingId = appData.getNode( ).get("chargingId");
    final JSONUserProfileData eceData = new JSONUserProfileData((ObjectNode) chargingId);
    final UserProfileProviderMessage provMsg = context.createProviderMessage("p2", eceData);
    // Dispatch to Provider
    provMsg.send( );
  } else {
    if (context.hasResponses( )) {
      final UserProfileProviderMessage pMsg = context.getProviderResponse("p2");
      final JSONUserProfileData providerData = pMsg.getData(JSONUserProfileData.class);
      final JSONUserProfileData appData = translation.mapReadResponse(providerData, context);
      UserProfileResponse response;
      if (pMsg.getResponseStatus( ).isSuccess( )) {
        response = context.createSuccessResponse(appData);
      } else {
        response = context.createErrorResponse(pMsg.getResponseStatus( ));
      }
      // Send to App
      response.send( );
    }
  }
}
```

In some embodiments, multiple translation layer interfaces can be used within the federation layer. In one embodiment, a default translation layer, "TranslationLayer<V, P>", supports just a single data type for the view as well as the provider:

```
/**
 * Provides the translation interface when the Provider exposes a single
type for both
 * request and response for all the supported operations.
 *
 * @param <V> the View data type
 * @param <P> the Provider data type
 */
public interface TranslationLayer<V, P> {
...
}
```

In one embodiment, the TranslationLayer below supports just a single type for the view as different request and response type for the provider using the same data type.

```
/**
 * The Federation layer with individual types for request and response
operations.
 *
 * @param <V> the View data type
 * @param <Q> the Provider Request data type
 * @param <S> the Provider Response data type
 */
public interface TranslationLayer2<V, Q, S> {
...
}
```

In one embodiment, the TranslationLayer below supports different data types for each Read and Update operation including the Request and Response types.

```
/**
 * The Federation layer with individual read/write types for request,
response and notify operations.
 *
 * @param <V> the View data type
 * @param <Q> the Provider Read Request data type
 * @param <S> the Provider Read Response data type
 * @param <U> the Provider Update Request data type
 * @param <T> the Provider Update Response data type
 * @param <N> the Provider Notify Response data type
 */
public interface TranslationLayer5<V, Q, S, U, T, N> {
...
}
```

Figure 7:
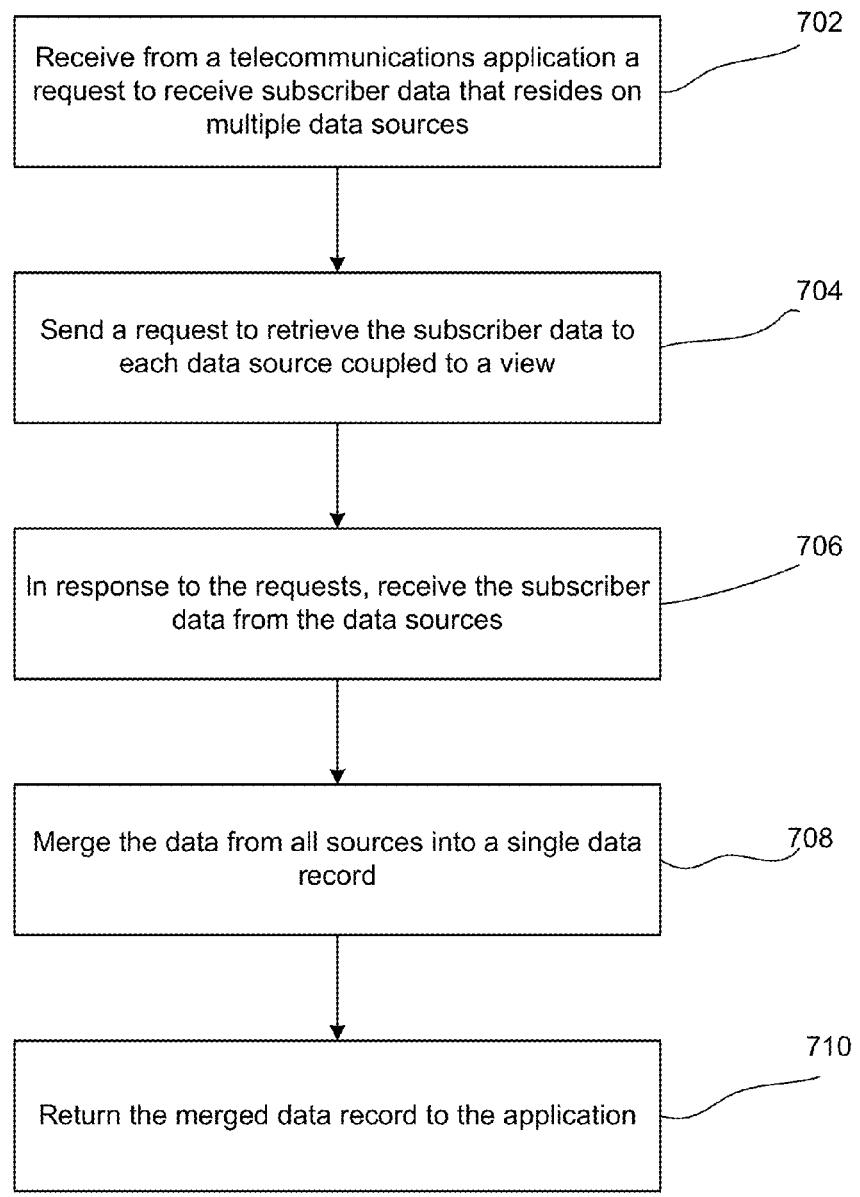
FIG. 7 is a flow diagram of the functionality of a subscriber data federation module of FIG. 3 and other elements in accordance with one embodiment of the present invention.

FIG. 7 is a flow diagram of the functionality of subscriber data federation module 16 of FIG. 3 and other elements in accordance with one embodiment of the present invention. In one embodiment, the functionality of the flow diagram of FIG. 7 is implemented by software stored in memory or other computer readable or tangible medium, and executed by a processor. In other embodiments, the functionality may be performed by hardware (e.g., through the use of an application-specific integrated circuit ("ASIC"), a programmable gate array ("PGA"), a field programmable gate array ("FPGA"), etc.), or any combination of hardware and software.

At 702, a request to receive subscriber data that resides on multiple data sources is received from a telecommunications application. In one embodiment, the application is an OCE-CAS application or other application than handles calls on a SIP based telecommunications network. In one embodiment, the request is received at a view that include federation logic. In one embodiment, the view is a subscriber store view. The view is coupled to multiple data sources that include subscriber data. In one embodiment, each data source is an HSS database, or local data.

At 704, a request to retrieve the subscriber data is sent to each data source coupled to the view.

At 706, in response to the requests, the subscriber data is received from the sources.

At 708, the data from all sources is merged into a single data record.

At 710, the merged data record is returned to the application.

The functionality of FIG. 7 is for performing a "Read" operation from the data sources. However, similar functionality can be performed for both "Update" and "Notify" operations.

As disclosed, federation in accordance with embodiments of the invention separates the requesting application from the persistent store and allows for the data to be distributed across multiple sources. The federation leads to improve call control by the application. Further, any configuration changes can be made at a federation layer instead of at the application server. Further, embodiments allow a telecommunications vendor to scale the HSS or other subscriber data separately from the server running the services, which is desirable for Network Function Virtualization ("NFV").

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to retrieve subscriber data for a telecommunications network, the retrieving comprising:
   receiving, at a first view of a plurality of views, a request for the subscriber data from a telecommunications application, wherein the subscriber data resides on multiple data sources;
   sending the request to each of the multiple data sources through an adaptor layer that is separated from a requesting application;
   receiving the subscriber data from each of the multiple data sources coupled to the first view based on a functionality to be provided;
   merging, at the first view, the subscriber data of the multiple data sources into a single data record; and
   returning the single data record having merged data to the telecommunications application,
   wherein the first view is coupled to different data sources than other views of the plurality of views.

2. The non-transitory computer readable medium of claim 1, wherein each data source comprises at least one of a Home Subscriber Server (HSS) or a data source local to the telecommunications application.

3. The non-transitory computer readable medium of claim 1, wherein the telecommunications network comprises a Session Initiation Protocol (SIP) based network.

4. The non-transitory computer readable medium of claim 2, wherein a data source local to the telecommunications application comprises a not only SQL (NoSQL) database.

5. The non-transitory computer readable medium of claim 1, wherein the merged data record comprises a JavaScript Object Notation (JSON) document.

6. The non-transitory computer readable medium of claim 5, wherein each data source comprises attributes, and the attributes comprise a data type, a JSON schema and an access level.

7. The non-transitory computer readable medium of claim 1, further comprising an interface between the application and the data sources, wherein the interface comprises at least one of a Java application program interface or a Diameter protocol based SH interface.

8. A method of retrieving subscriber data for a telecommunications network, the method comprising:
   receiving, at a first view of a plurality of views, a request for the subscriber data from a telecommunications application, wherein the subscriber data resides on multiple data sources;
   sending the request to each of the multiple data sources through an adaptor layer that is separated from a requesting application;
   receiving the subscriber data from each of the multiple data sources coupled to the first view based on a functionality to be provided;
   merging, at the view, the subscriber data of the multiple data sources into a single data record; and
   returning the single data record having merged data to the telecommunications application,
   wherein the first view is coupled to different data sources than other views of the plurality of views.

9. The method of claim 8, wherein each data source comprises at least one of a Home Subscriber Server (HSS) or a data source local to the telecommunications application.

10. The method of claim 8, wherein the telecommunications network comprises a Session Initiation Protocol (SIP) based network.

11. The method of claim 9, wherein a data source local to the telecommunications application comprises a not only SQL (NoSQL) database.

12. The method of claim 8, wherein the merged data record comprises a JavaScript Object Notation (JSON) document.

13. The method of claim 12, wherein each data source comprises attributes, and the attributes comprise a data type, a JSON schema and an access level.

14. The method of claim 8, further comprising an interface between the application and the data sources, wherein the interface comprises at least one of a Java application program interface or a Diameter protocol based SH interface.

15. An application server for a telecommunications network, the server comprising:
   a processor;
   a storage device coupled to the processor that stores instructions that implement a first view of a plurality of views that includes a merge module when executed by the processor;
   at the first view, receiving a request for subscriber data from a telecommunications application, wherein the subscriber data resides on multiple data sources, and sending the request to each of the multiple data sources coupled to the view based on a functionality to be provided, wherein the request is sent through an adaptor layer that is separated from a requesting application; and
   at the merge module, receiving the subscriber data from the multiple data sources coupled to the first view, merging the subscriber data into a single data record, and returning the merged data record to the telecommunications application,
   wherein the first view is coupled to different data sources than other views of the plurality of views.

16. The application server of claim 15, wherein each data source comprises at least one of a Home Subscriber Server (HSS) or a data source local to the telecommunications application.

17. The application server of claim 15, wherein the telecommunications network comprises a Session Initiation Protocol (SIP) based network.

18. The application server of claim 16, wherein a data source local to the telecommunications application comprises a not only SQL (NoSQL) database.

19. The application server of claim 16, wherein the merged data record comprises a JavaScript Object Notation (JSON) document and each data source comprises attributes, and the attributes comprise a data type, a JSON schema and an access level.

20. The application server of claim 15, further comprising an interface between the application and the data sources, wherein the interface comprises at least one of a Java application program interface or a Diameter protocol based SH interface.

\* \* \* \* \*